United States Patent [19]

Nakazawa et al.

[11] Patent Number: 4,564,602
[45] Date of Patent: Jan. 14, 1986

[54] HIGH PERMITTIVITY CERAMIC COMPOSITION

[75] Inventors: Yasuyuki Nakazawa, Yokaichi; Yoshiharu Kato, Takatsuki, both of Japan

[73] Assignee: Murata Manufacturing Co., Ltd., Japan

[21] Appl. No.: 656,148

[22] Filed: Sep. 28, 1984

[30] Foreign Application Priority Data

Sep. 29, 1983 [JP] Japan .................. 58-182486

[51] Int. Cl.$^4$ ............................................. C04B 35/46
[52] U.S. Cl. ..................................... 501/137; 501/138; 501/139; 501/152
[58] Field of Search .......................... 501/137, 138, 139

[56] References Cited

U.S. PATENT DOCUMENTS 2,836,501  5/1958  Crownover ........................ 501/137
3,103,442  11/1963  Ziotnick .............................. 501/139
4,537,865  8/1985  Okabe et al. ...................... 501/135

OTHER PUBLICATIONS

"Understanding Chip Capacitors", Johanson Dielectrics Inc., received Dec. 6, 1982.

Primary Examiner—William R. Dixon, Jr.
Assistant Examiner—Karl Group
Attorney, Agent, or Firm—Ostrolenk, Faber, Gerb & Soffen

[57] ABSTRACT

A high permittivity ceramic composition comprises, by weight, 84.25 to 92.4% of substantially stoichiometric barium titanate; substantially stoichiometric calcium zirconate and substantially stoichiometric calcium stannate, the sum of said calcium zirconate and calcium stannate being 9.5 to 13.5%, the weight ratio of said calcium zirconate to calcium stannate being 1:2.5 to 3:1; 0.05 to 0.25% of substantially stoichiometric magnesium titanate; and 0.05 to 2.0% of at least one oxide of rare earth elements.

13 Claims, 7 Drawing Figures

HIGH PERMITTIVITY CERAMIC COMPOSITION

This invention relates to a high permittivity ceramic composition.

Solid solutions of a $BaTiO_3$—$SrTiO_3$ system and of a $BaTiO_3$—$BaZrO_3$ system have been known as high permittivity ceramic compositions. The ceramic compositions of the $BaTiO_3$—$SrTiO_3$ systems are high in permittivity but cannot be put into practical use because of their large temperature change rate of permittivity. The ceramic compositions of the $BaTiO_3$—$BaZrO_3$ systems have received practical application as a dielectric material for ceramic capacitors, but they are poor in the sintering properties and their electrical properties are considerably affected by a process for preparation of electrodes. For example, if the $BaTiO_3$—$BaZrO_3$ ceramic bodies are immersed in an electroless plating bath to provide electrodes of nickel or copper, plating, their dielectric loss is greatly increased and the insulating resistance is greatly decreased.

It is therefore an object of the present invention to provide a high permittivity ceramic composition having practicable temperature characteristics of dielectric constant.

Another object of the present invention is to provide a high permittivity ceramic composition which is not influenced very much in electrical properties even if the ceramic composition is electrolessly plated to form electrodes of nickel or copper.

These and other objects of the present invention can be achieved by providing a high permittivity ceramic composition comprising, by weight, 84.25 to 92.4% of substantially stoichiometric barium titanate; substantially stoichiometric calcium zirconate and substantially stoichiometric calcium stannate, the sum of said calcium zirconate and calcium stannate being 9.5 to 13.5%, the weight ratio of said calcium zirconate to calcium stannate being 1:2.5 to 3:1; 0.05 to 0.25% of substantially stoichiometric magnesium titanate; and 0.05 to 2.0% of at least one oxide of rare earth elements.

The wording "substantially stoichiometric" used in the present specification is to be understood to include formulations composed of a divalent metal oxide and tetravalent metal oxide, which are within slight deviation from stoichiometry. In other words, barium titanate, calcium zirconate and calcium stannate may include formulations in which a mole ratio of a divalent metal oxide (i.e., BaO or CaO) to a tetravalent metal oxide (i.e., $TiO_2$, $ZrO_2$ or $SnO_2$) slightly deviates from the stoichiometric ratio. For example, the mole ratio of BaO to $TiO_2$ in $BaTiO_3$ may vary from as low as 0.99 to as high as 1.01. However, it is preferred that barium titanate is rich in BaO, i.e., barium titanate has a mole ratio of BaO to $TiO_2$ ranging from about 1.0 to 1.01 because the ceramic compositions containing barium-rich barium titanate have a fine grain size and a high insulating resistance of the order of $10^{12}$ ohms and are low in scattering of the electrical characteristics. The mole ratio of CaO to $ZrO_2$ in $CaZrO_3$ may vary from as low as 0.95 to as high as 1.05. Also, the mole ratio of CaO to $SnO_2$ in $CaSnO_3$ may vary from 0.95 to 1.05. If the mole ratio of the divalent metal oxide to the tetravalent metal oxide is greater than 1:1, the ceramic composition may be prevented from reduction during sintering. If the mole ratio of the divalent metal oxide to the tetravalent metal oxide is less than 1:1, their sintering become ease.

Also, the mole ratio of MgO to $TiO_2$ in magnesium titanate may vary from 0.75 to 1.25. If the MgO content in $MgTiO_3$ is in slightly excess of that stoichiometrically required, the composition may be prevented from reduction. If the content of $TiO_2$ in $MgTiO_3$ is in slightly excess of that stoichiometrically required, the sintering of the ceramic composition become ease. Such modifications are included in the scope of the present invention.

The reasons why the composition of the present invention has been limited to the above range are as follows: For applications of the high permittivity ceramic compositions, they are required to have a high dielectric constant at room temperature. They must have a curie point, i.e., a temperature at which a dielectric constant takes the maximum value, within a temperature range of from $+5°$ to $+40°$ C.

Both calcium zirconate and calcium stannate serve as a shifter and linearly decrease the curie point of the ceramic composition. The sole addition of calcium zirconate lowers the curie point at a rate of $8°$ to $10°$ C. per 1 weight %, whereas that of calcium stannate lowers the curie point at a rate of $10°$ to $12°$ C. per 1 weight %. However, if the sum of contents of calcium zirconate and calcium stannate is less than 9.5 weight %, the curie point can not be lowered sufficiently, thus making it impossible to obtain ceramic compositions with a high dielectric constant at room temperature. If the sum of contents of these additives exceeds 13.5 weight %, the curie point is lowered too much to obtain ceramic compositions with a high dielectric constant at room temperature. The addition of calcium zirconate to the ceramic composition makes a temperature characteristic curve of dielectric constant flat, but causes decrease of the maximum value of dielectric constant ($\epsilon$max). In contrast thereto, the addition of calcium stannate increases the maximum value of dielectric constant, but it makes the temperature characteristic curve of permittivity sharp. It is therefore required to adjust the ratio of calcium zirconate to calcium stannate to make the best use of their respective advantages. A preferred weight ratio of calcium zirconate to calcium stannate may vary from as low as 1:2.5 to as high as 3:1. If the weight ratio of calcium zirconate to calcium stannate exceeds 3:1, the dielectric constant is lowered too much to put ceramic compositions into practical use. If the weight ratio of calcium zirconate to calcium stannate is less than 1:2.5, the temperature characteristics of permittivity become worse.

The content of magnesium titanate has been limited within the range of 0.05 to 0.25 weight % for the following reasons. If the content of magnesium titanate is less than 0.05 weight %, it is impossible to produce sufficiently sintered ceramic bodies. If the content of magnesium titanate exceeds 0.25 weight %, the sintering properties of the ceramic become worse. Magnesium titanate contributes to make a temperature characteristic curve of dielectric constant flat, lowers the curie point and decreases the maximum value of dielectric constant. In the range of 0.05 to 0.15 weight %, magnesium titanate lowers the curie point and the maximum value of dielectric constant and makes the temperature characteristic curve of dielectric constant flat. In the range of 0.15 to 0.25 weight %, magnesium titanate does not contribute to lower the curie point any more, but lowers the maximum value of dielectric constant and makes the temperature characteristic curve of dielectric constant flat.

The oxides of rare earth elements contribute to decrease the dielectric loss. If the content of the oxides of rare earth elements is less than 0.05 weight %, its addition takes no recognizable effect. If the content of oxides of rare earth elements exceeds 2.0 weight %, no further effect can be obtained.

The balance is barium titanate and its content ranges from 84.25 to 92.5 weight %.

The oxides of rare earth elements include, without being limited to, $La_2O_3$, $Ce_2O_3$, $Pr_2O_3$, $Sm_2O_3$ and $Dy_2O_3$. These oxides may be used alone or in combination.

Additionally, the ceramic composition of the present invention may further includes a very small amount of at least one additives such as $SiO_2$, $Al_2O_3$, ZnO, $Bi_2O_3$, $B_2O_3$, $WO_3$, $Fe_2O_3$, $Co_2O_3$, manganese oxide and clay as an agent for improving electrical properties and/or sintering properties. A preferred content of such an additive is not more than 2 weight %. If the content of these additive exceeds 2 weight %, it is not possible to obtain ceramic compositions having good characteristics.

According to the present invention, there is provided a high permittivity ceramic composition having a high dielectric constant not less than 9000 and a low dielectric loss factor (tan δ) of not more than 2.5 %.

The invention will be further apparent from the following description with reference to preferred embodiments of the present invention and the accompanying drawings.

EXAMPLE 1

Figure 1:
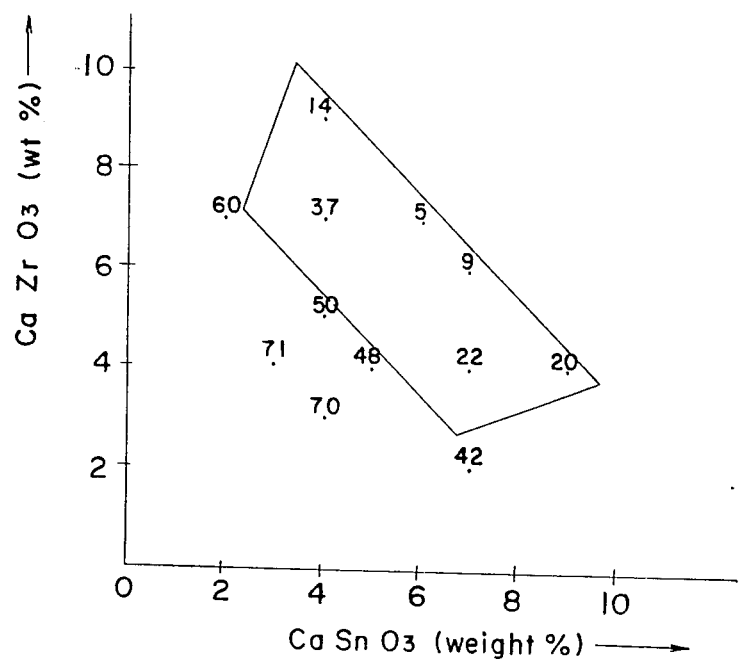
FIGS. 1 to 3 are graphs showing variations of the curie point, the maximum value of dielectric constant and temperature characteristics of dielectric constant with the contents of $CaZrO_3$ and $CaSnO_3$ in the system $BaTiO_3$—$CaZrO_3$—$CaSnO_3$—$MgTiO_3$—$CeO_2$—$MnO_2$—clay.

There were prepared $BaTiO_3$, $CaZrO_3$, $CaSnO_3$, $MgTiO_3$, $CeO_2$, $Fe_2O_3$ and $SiO_2$ as raw materials. These raw materials were weighed and mixed to produce a ceramic composition having compositional proportions shown in Table 1. The mole ratio of BaO to $TiO_2$ in $BaTiO_3$ was 1:1. The mole ratio of CaO to $ZrO_2$ in $CaZrO_3$ was 1:0.95. The mole ratio of CaO to $SnO_2$ in $CaSnO_3$ was 1:1. The mole ratio of MgO to $TiO_2$ in $MgTiO_3$ was 1:1. The weight ratio of $CaZrO_3$ to $CaSnO_3$ was 1.75:1.

TABLE 1

| | |
|---|---|
| $BaTiO_3$ | 88.0 weight % |
| $CaZrO_3$ | 7.0 weight % |
| $CaSnO_3$ | 4.0 weight % |
| $MgTiO_3$ | 0.20 weight % |
| $CeO_2$ | 0.11 weight % |
| $Fe_2O_3$ | 0.09 weight % |
| $SiO_2$ | 0.60 weight % |

The resultant mixture was milled in a ball-mill by the wet process together with a suitable amount of water. The resultant mixture was dehydrated, dried, granulated with an organic binder, and then pressed into disks under a pressure of 750 kg/cm$^2$. The disks were fired in air at 1360° C. for 1 hour to prepare ceramic disks with a diameter of 8 mm and a thickness of 0.5 mm.

The resultant ceramic disks were chemically plated in the known manner to form electrodes of electrolessly plated nickel film on their opposed surfaces.

The thus obtained specimens were subjected to measurements of dielectric constant (ε), dielectric loss factor (tan δ), temperature characteristic of dielectric constant (TC), a curie point (CP) and insulating resistance (IR). The dielectric constant and dielectric loss factor were measured at 25° C. and 1 kHz. The temperature characteristic of dielectric constant was determined within the range of +10° C. to +85° C. and expressed as a temperature change rate of the dielectric constant relative to the dielectric constant measured at 25° C. The change rate was calculated by an equation:

$$TC = \frac{\epsilon - \epsilon_{+25° C.}}{\epsilon_{+25° C.}} \times 100(\%)$$

where
ε=dielectric constant at a measuring temperature
$\epsilon_{+25° C.}$=dielectric constant at 25° C.

The insulating resistance was measured after 40 seconds later since a DC voltage of 500 V was applied between the opposed electrodes. Results were as follows:

ε: 10,000
tan δ: 1.5%
TC: −8% at +10° C.; −43.5% at +85° C.
curie point: +35° C.
IR: 2×10$^{11}$ ohms

EXAMPLE 2

There were prepared $BaTiO_3$, $CaZrO_3$, $CaSnO_3$, $MgTiO_3$ $Nd_2O_3$, $MnO_2$ and $Al_2O_3$ as raw materials. These raw materials were weighed and mixed to produce a ceramic composition having compositional proportions shown in Table 2. The mole ratio of BaO to $TiO_2$ in $BaTiO_3$ was 1:1. The mole ratio of CaO to $ZrO_2$ in $CaZrO_3$ was 1:1. The mole ratio of CaO to $SnO_2$ in $CaSnO_3$ was 1.05:1. The mole ratio of MgO to $TiO_2$ in $MgTiO_3$ was 1.25:1. The weight ratio of $CaZrO_3$ to $CaSnO_3$ was 1:2.125.

TABLE 2

| | |
|---|---|
| $BaTiO_3$ | 87.0 weight % |
| $CaZrO_3$ | 4.0 weight % |
| $CaSnO_3$ | 8.5 weight % |
| $MgTiO_3$ | 0.1 weight % |
| $Nd_2O_3$ | 0.1 weight % |
| $MnO_2$ | 0.1 weight % |
| $Al_2O_3$ | 0.2 weight % |

The resultant mixture was treated in the same manner as in Example 1 except for that the firing temperature was 1330° C.

The electrical and physical properties of the specimens were measured in the same manner as in Example 1. Results obtained were as follows:

$\epsilon$: 14,000
tan $\delta$: 2.0%
TC: +21% at +10° C.; −79% at +85° C.
curie point: +8° C.
IR: $3.2 \times 10^{11}$ ohms

EXAMPLE 3

There are prepared $BaTiO_3$, $CaZrO_3$, $CaSnO_3$, $MgTiO_3$ $BaCO_3$, $Sm_2O_3$, $Co_2O_3$ and clay as raw materials. These raw materials were weighed and mixed to produce a ceramic composition having compositional proportions shown in Table 3. The mole ratio of BaO to $TiO_2$ in $BaTiO_3$ was 1:1. The mole ratio of CaO to $ZrO_2$ in $CaZrO_3$ was 1:0.97. The mole ratio of CaO to $SnO_2$ in $CaSnO_3$ was 1:0.97. The mole ratio of MgO to $TiO_2$ in $MgTiO_3$ was 1:1. The weight ratio of $CaZrO_3$ to $CaSnO_3$ was about 1:2.3.

TABLE 3

| | |
|---|---|
| $BaTiO_3$ | 86.5 weight % |
| $CaZrO_3$ | 3.5 weight % |
| $CaSnO_3$ | 8.0 weight % |
| $MgTiO_3$ | 0.15 weight % |
| $BaCO_3$ | 0.73 weight % |
| $Sm_2O_3$ | 0.90 weight % |
| $Co_2O_3$ | 0.12 weight % |
| Clay | 0.10 weight % |

The resultant mixture was treated in the same manner as in Example 1 to prepare specimens.

The resultant specimens were subjected to measurements of electrical and physical properties in the same manner as in Example 1. Results obtained were as follows:

$\epsilon$: 12,500
tan $\delta$: 1.0%
curie point: +15° C.
TC: +2% at +10° C.; −72% at +85° C.
IR: $10^{12}$ ohms

EXAMPLE 4

To determine variations of a curie temperature, the maximum value of dielectric constant ($\epsilon_{max}$) and a temperature characteristic of dielectric constant with contents of $CaZrO_3$ and $CaSnO_3$ in the system $BaTiO_3$—$CaZrO_3$—$CaSnO_3$—$MgTiO_3$—$CeO_2$—$MnO_2$—clay, there were prepared ceramic compositions containing from 2 to 10 parts by weight of $CaZrO_3$ and 2 to 10 parts by weight of $CaSnO_3$ in the same manner as in Example 1. Each mixture of raw materials comprised 88.088 parts by weight of $BaTiO_3$, 0.196 parts by weight of $MgTiO_3$, 0.176 parts by weight of $CeO_2$, 0.039 parts by weight of $MnO_2$ and 0.636 parts by weight of clay.

The electrical properties of the specimens were measured in the same manner as in Example 1. Results are shown in FIGS. 1 to 3.

FIG. 1 shows variations of the curie point, i.e., a temperature at which the the dielectric constant takes a peak value, with the contents of $CaZrO_3$ and $CaSnO_3$ in $BaTiO_3$—$CaZrO_3$—$CaSnO_3$—$MgTiO_3$—$CeO_2$—$MnO_2$—clay.

As can be seen from this figure, the compositions in which the sum of the contents of $CaZrO_3$ and $CaSnO_3$ is less than 9.5 weight % has a high curie point beyond the temperature of practical use, whereas the compositions in which the sum of the content of $CaZrO_3$ and $CaSnO_3$ exceeds 13.5 weight % have a low curie point beyond the temperature of practical application. Thus, the ceramic compositions which have a high dielectric constant at ordinary temperature can be obtained only when the sum of the contents of $CaZrO_3$ and $CaSnO_3$ is in the range of 9.5 to 13.5 weight %.

Figure 2:
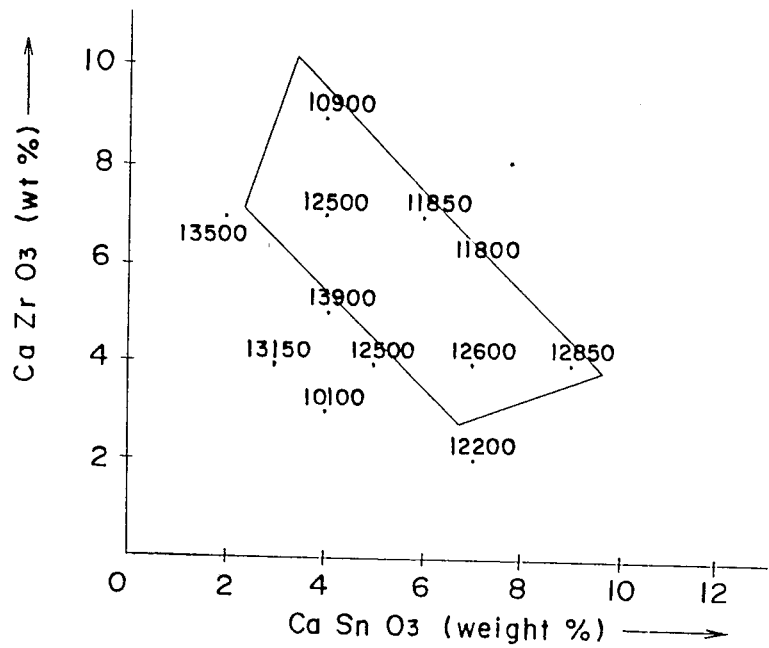
Figure 3:
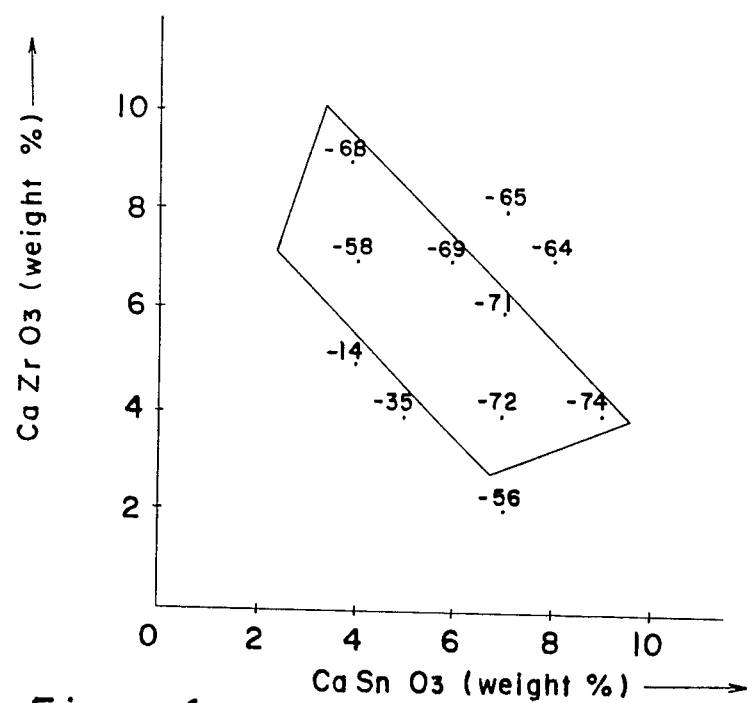

FIG. 2 shows variations of the peak dielectric constant with the contents of $CaZrO_3$ and $CaSnO_3$ in $BaTiO_3$—$CaZrO_3$—$CaSnO_3$—$MgTiO_3$—$CeO_2$—$MnO_2$—clay. As can be seen from FIG. 2, the maximum value of dielectric constant become low if a weight ratio of $CaZrO_3$ to $CaSnO_3$ is larger than 3:1.

FIG. 3 shows variations of the temperature change rate of dielectric constant with the contents of $CaZrO_3$ and $CaSnO_3$ in $BaTiO_3$—$CaZrO_3$—$CaSnO_3$—$MgTiO_3$—$CeO_2$—$MnO_2$—clay. As can be seen from this figure, it is not possible to produce ceramic compositions with good temperature characteristics of dielectric constant if a weight ratio of $CaZrO_3$ to $CaSnO_3$ is less than 1:2.5. The temperature change rate of dielectric constant become large at lower temperatures with decrease of the weight ratio of $CaZrO_3$ to $CaSnO_3$.

In FIGS. 1 to 3, the area encompassed by solid lines shows the compositions having a curie point ranging from +5° to +40° C. that is suitable for the practical use. The compositions falling within the above area have a high dielectric constant, good temperature characteristics of dielectric constant and a low dielectric loss factor (tan $\delta$), which are sufficient for practical application.

As can be seen from FIG. 2, some of the compositions out of the above area have a dielectric constant higher than that of the compositions falling within the area encompassed by solid lines, but they have a curie points at a temperature beyond the practicable range. For this reason, these compositions are excluded from the scope of the present invention. In FIG. 3, there are some compositions out of the above area having a temperature change rate of dielectric constant smaller than that of the compositions falling within the above area. However, these compositions have a curie point at a temperature beyond the temperature range for practical application. For this reason, the compositions out of the above area are excluded from the scope of the present invention.

EXAMPLE 5

To determine variations of temperature characteristic of dielectric constant with the content of $CaZrO_3$ in the system $BaTiO_3$—$CaZrO_3$—$CaSnO_3$—$MgTiO_3$—$CeO_2$—$MnO_2$—clay, there were prepared ceramic compositions containing from 2 to 10 weight % of $CaZrO_3$ in the same manner as in Example 1. Each mixture of raw materials comprised 88.088 parts by weight of $BaTiO_3$, 4.0 parts by weight of $CaSnO_3$, 0.15 parts by weight of $MgTiO_3$, 0.176 parts by weight of $CeO_2$, 0.039 parts by weight of $MnO_2$ and 0.636 parts by weight of clay.

The electrical properties of the specimens were measured in the same manner as in Example 1. Results are shown in FIG. 4.

Figure 4:
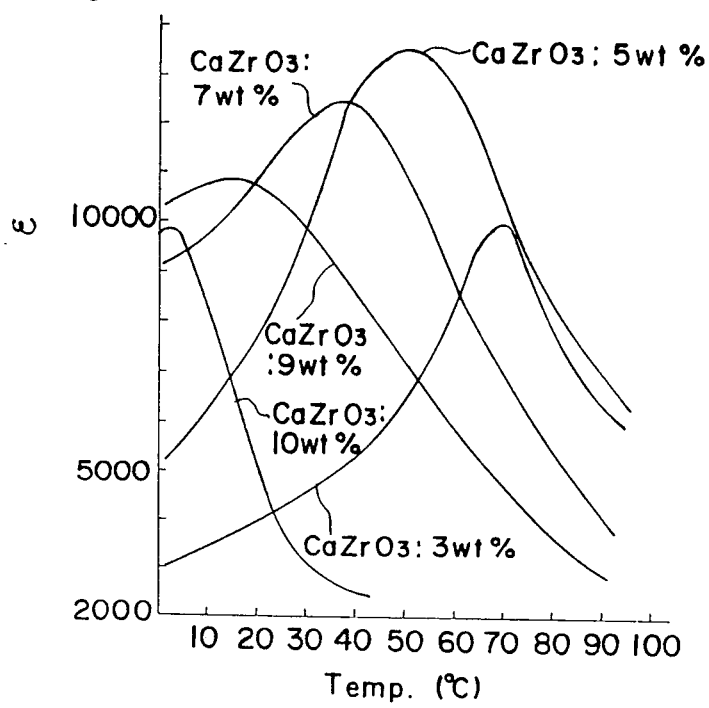
FIG. 4 is a graph showing variations of the temperature characteristics of dielectric constant with $CaZrO_3$ content in the system $BaTiO_3$—$CaZrO_3$—$CaSnO_3$—$MgTiO_3$—$CeO_2$—$MnO_2$—clay.

As can be seen from FIG. 4, the composition containing 3 weight % of $CaZrO_3$ (i.e., the sum of the contents of $CaZrO_3$ and $CaSnO_3$ is about 7.0 weight %) has a temperature characteristic curve of dielectric constant which is shifted to a lower temperature side too much as compared with the temperature characteristic curve having a peak value of dielectric constant at 25° C. Also, the composition containing 10 weight % of CaZrO₃ (the sum of the contents of CaZrO₃ and CaSnO₃ is about 14.0 weight %) has a temperature characteristic curve of dielectric constant which is shifted to a lower temperature too much, as compared with the temperature characteristic curve having a peak value of dielectric constant at 25° C. Accordingly, the sum of the contents of CaZrO₃ and CaSnO₃ is limited to the value within the range of 9.5 to 13.5 weight %.

EXAMPLE 6

To determine variations of temperature characteristic of dielectric constant with the content of CaSnO₃ in the system BaTiO₃—CaZrO₃—CaSnO₃—MgTiO₃—CeO₂—MnO₂—clay, there were prepared ceramic compositions containing from 2 to 10 weight % of CaSnO₃ in the same manner as in Example 1. Each mixture of the raw materials comprised 88.088 parts by weight of BaTiO₃, 4.0 parts by weight of CaZrO₃, 0.15 parts by weight of MgTiO₃, 0.176 parts by weight of CeO₂, 0.039 parts by weight of MnO₂ and 0.636 parts by weight of clay.

The electrical properties of the specimens were measured in the same manner as in Example 1. Results are shown in FIG. 5.

Figure 5:
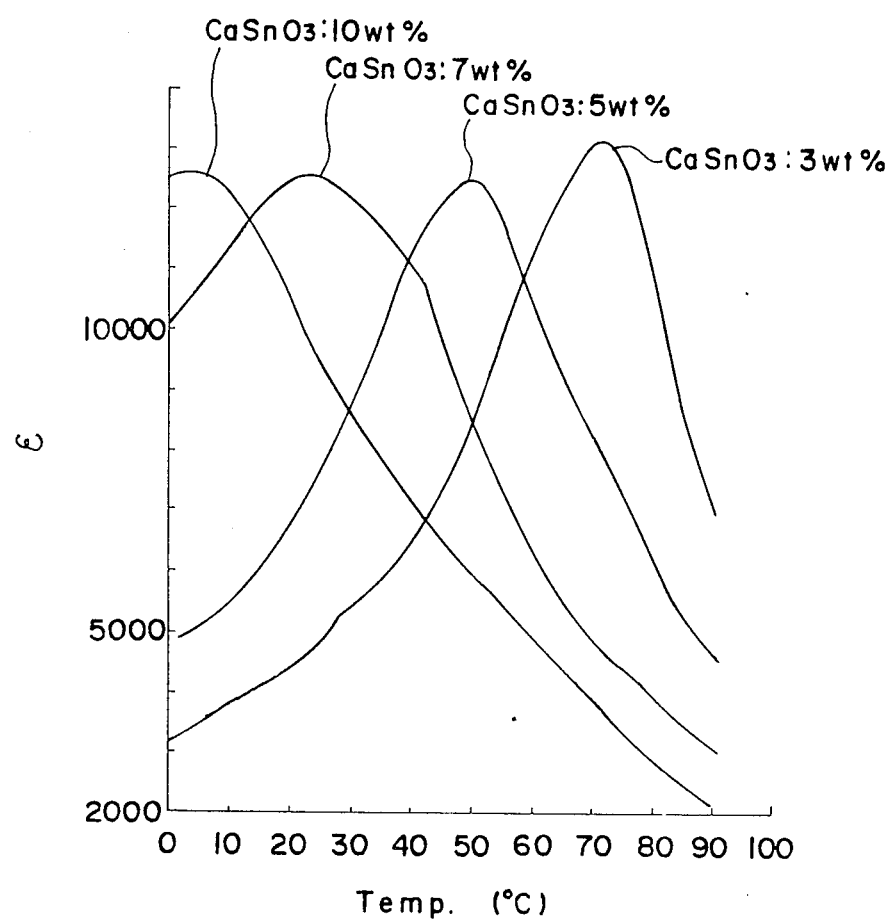
FIG. 5 is a graph showing variations of the temperature characteristics of dielectric constant with $CaSnO_3$ content in the system $BaTiO_3$—$CaZrO_3$—$CaSnO_3$—$MgTiO_3$—$CeO_2$—$MnO_2$—clay.

As can be seen from FIG. 5, the composition containing 3 weight % of CaSnO₃ (i.e., the sum of the contents of CaZrO₃ and CaSnO₃ is about 7.0 weight %) has a temperature characteristic curve of dielectric constant which is considerably shifted to a lower temperature as compared with the temperature characteristic curve having a peak value at 25° C. Also, the composition containing 10 weight % of CaSnO₃ (the sum of the contents of CaZrO₃ and CaSnO₃ is about 14.0 weight %) has a temperature characteristic curve of dielectric constant of which a peak value is considerably shifted to a lower temperature as compared with the temperature characteristic curve having a peak value at 25° C. Accordingly, the sum of the contents of CaZrO₃ and CaSnO₃ is limited to the value within the range of 9.5 to 13.5 weight %.

EXAMPLE 7

To determine variations of a curie point at which the dielectric constant takes the maximum value and the maximum value of the dielectric constant with the content of MgTiO₃ in the system BaTiO₃—CaZrO₃—CaSnO₃—MgTiO₃—CeO₂—MnO₂—clay, there were prepared ceramic compositions containing 0.025 to 0.30 weight % of MgTiO₃ in the same manner as in Example 1. Each mixture of raw materials comprised 88.088 parts by weight of BaTiO₃, 7.0 parts by weight of CaZrO₃, 4.0 parts by weight of CaSnO₃, 0.11 parts by weight of CeO₂, 0.039 parts by weight of MnO₂ and 0.636 parts by weight of clay.

The electrical properties of the specimens were measured in the same manner as in Example 1. Results are shown in FIG. 6.

Figure 6:
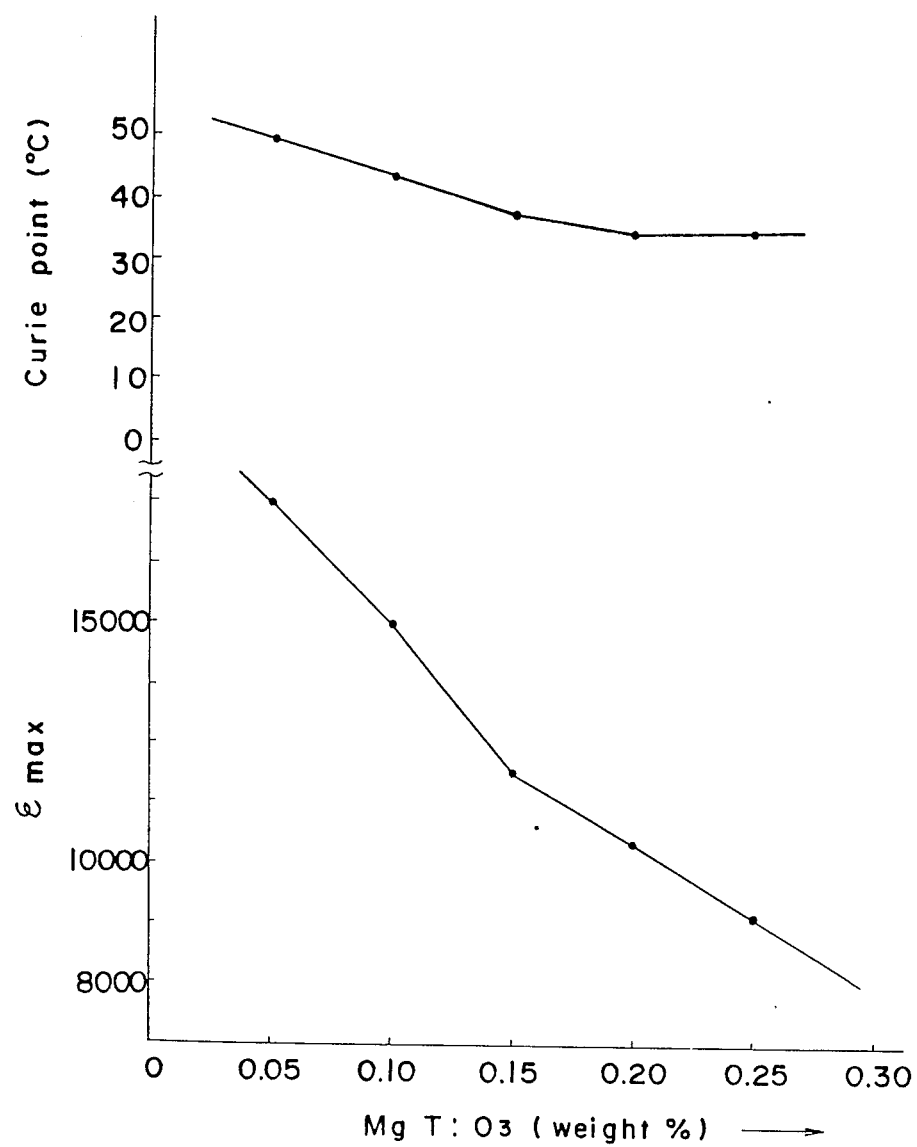
FIG. 6 is a graph showing variations of the curie point and maximum value of dielectric constant with $MgTiO_3$ content in the system $BaTiO_3$—$CaZrO_3$—$CaSnO_3$—$MgTiO_3$—$CeO_2$—$MnO_2$—clay.

As can be seen from this FIG. 6, the curie point and the maximum value of dielectric constant are lowered with the increase of the MgTiO₃ content. However, if the content of MgTiO₃ exceeds 0.25 weight %, the curie point is not lowered any more but the maximum value of the dielectric constant is further lowered. Accordingly, the preferred content of MgTiO₃ is limited to within the range of 0.05 to 0.25 weight %.

EXAMPLE 8

Figure 7:
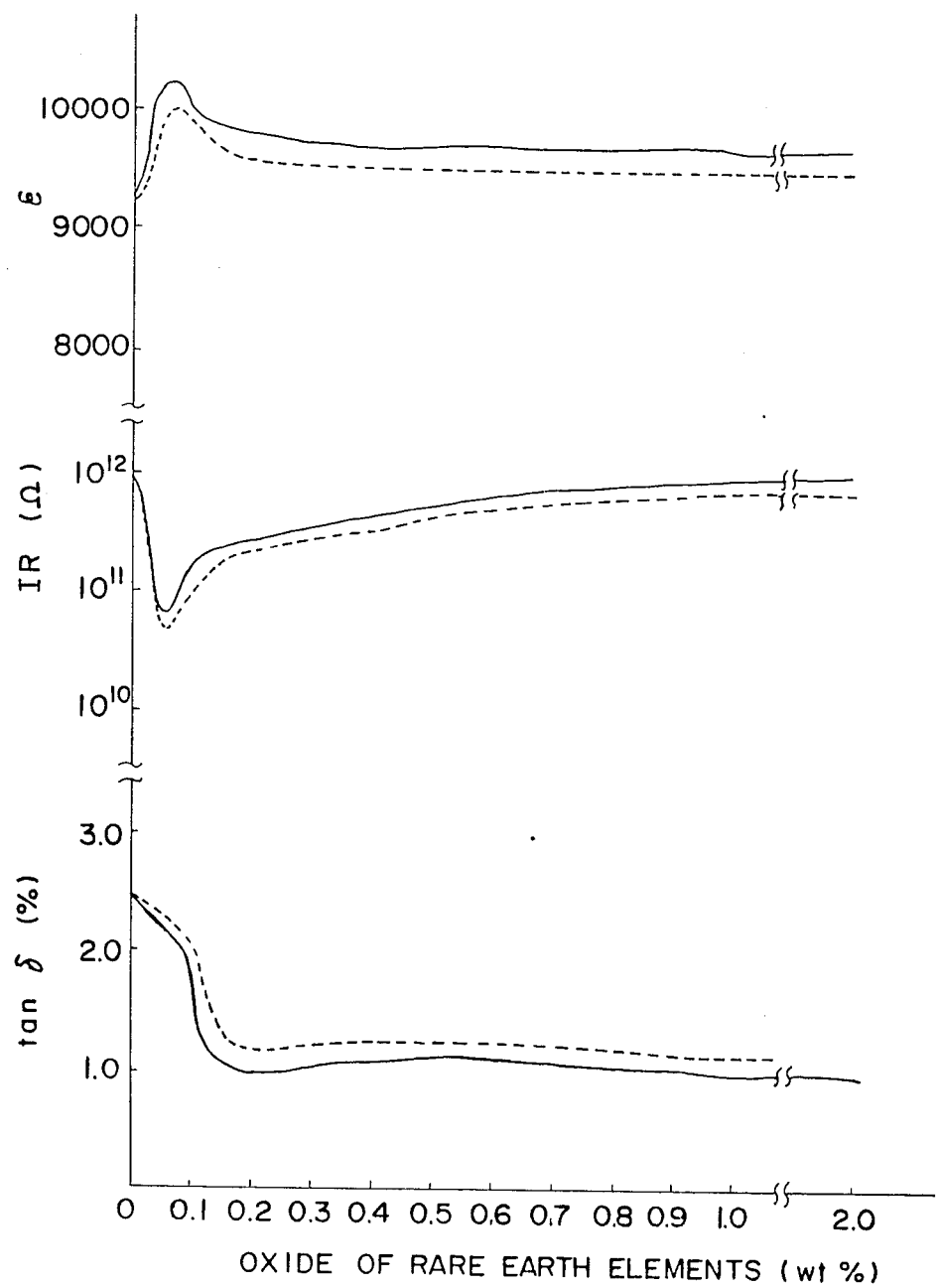
FIG. 7 is a graph showing variations of the dielectric constant, insulating resistance and maximum value of dielectric constant with the content of oxides of rare earth elements in the above system.

There were prepared ceramic compositions containing from 0 to 2.0 weight % of oxides of rare earth elements in the same manner as in Example 1 to determine variations of dielectric constant ($\epsilon$), insulating resistance (IR) and a dielectric loss factor (tan $\delta$) with the content of rare earth elements in the system BaTiO₃—CaZrO₃—CaSnO₃—MgTiO₃—CeO₂—MnO₂—clay. Mixtures of raw materials were respectively prepared by mixing a calculated amount of oxides of rare earth elements with a mixture of 88.088 parts by weight of BaTiO₃, 7.93 parts by weight of CaZrO₃, 2.94 parts by weight of CaSnO₃, 0.196 parts by weight of MgTiO₃, 0.039 parts by weight of MnO₂ and 0.636 parts by weight of clay. The electrical properties of the specimens were measured in the same manner as in Example 1. Results are shown in FIG. 7. In this figure, solid lines show the results for the compositions containing CeO₂ as the oxide of rare earth elements, and broken lines show those for the compositions each containing La₂O₃, Nd₂O₃, Sm₂O₃ or Dy₂O₃.

As can be seen from FIG. 7, the addition of oxides of rare earth elements in an amount of 0.05 weight % and above improves the dielectric constant and dielectric loss factor (tan $\delta$), but further increase, even if more than 2 weight % is incorporated, has no appreciable effect. Accordingly, the content of the oxides of rare earth elements ranges from 0.05 to 2.0 weight %. The insulating resistance curve shows the minimum value at about 0.05 weight % of the oxide of rare earth elements, but that value does not matter in practical application.

In Examples 4 to 7, the amounts of the components of which the compositional proportions are fixed to constant are expressed in the unit, parts by weight, but they may be converted into the content of the respective components expressed in the unit, weight %, by the following equation:

$$\frac{x}{y} \times (100 - z)$$

where x is an amount of each component (parts by weight)

y is the sum of amounts of all the components except the component of which the amount is varied (parts by weight)

z is the content of the component of which the amount is varied (weight %).

What I claim is:

1. A high permittivity ceramic composition having a dielectric constant not less than 9000 and a dielectric loss factor of not more than 2.5% consisting essentially of, by weight, 84.25 to 92.4% of substantially stoichiometric barium titanate; substantially stoichiometric calcium zirconate and substantially stoichiometric calcium stannate, the sum of said calcium zirconate and calcium stannate being 9.5 to 13.5%, the weight ratio of said calcium zirconate to calcium stannate being 1:2.5 to 3:1; 0.05 to 0.25% of substantially stoichiometric magnesium titanate wherein the mole ratio of MgO to TiO₂ is within the range of 0.75 to 1.25; and 0.05 to 2.0% of at least one oxide of rare earth elements.

2. A high permittivity ceramic composition according to claim 1 wherein the mole ratio of BaO to TiO₂ in said substantially stoichiometric barium titanate is within the range of 0.99 to 1.01.

3. A high permittivity ceramic composition according to claim 1 wherein the mole ratio of CaO to $ZrO_2$ in said substantially stoichiometric calcium zirconate is within the range of 0.95 to 1.05.

4. A high permittivity ceramic composition according to claim 1 wherein the mole ratio of CaO to $SnO_2$ in said substantially stoichiometric calcium stannate is within the range of 0.95 to 1.05.

5. A high permittivity ceramic composition according to claim 4 wherein the mole ratio of BaO to $TiO_2$ in said substantially stoichiometric barium titanate is with the range of 0.99 to 1.01.

6. A high permittivity ceramic composition according to claim 1 wherein the mole ratio of CaO to $ZrO_2$ in said substantially stoichiometric calcium zirconate is within the range of 0.95 to 1.05.

7. A high permittivity ceramic composition according to claim 6 wherein the mole ratio of CaO to $SnO_2$ in said substantially stoichiometric calcium stannate is within the range of 0.95 to 1.05.

8. A high permittivity ceramic composition according to claim 8 wherein the amount of substantially stoichiometric barium titanate is 86.5 to 88 weight %, the amount of said substantially stoichiometric calcium zirconate is 3.5 to 7 weight %, the amount of said substantially stoichiometric calcium stannate is 4 to 8.5%, the amount of said substantially stoichiometric magnesium titanate is 0.1 to 0.2 weight % and the amount of said oxide of rare earth elements is 0.1 to 0.9 weight %.

9. A high permittivity ceramic composition according to claim 7 wherein the amount of said substantially stoichiometric barium titanate is 88% by weight, the amount of said substantially stoichiometric calcium zirconate is 7 weight %, the amount of said substantially stoichiometric calcium stannate is 4 weight %, the amount of said substantially stoichiometric magnesium titanate is 0.2%, and said oxide of rare earth elements is $Ce_2O_3$ in an amount of 0.11 weight %.

10. A high permittivity ceramic composition according to claim 7 wherein the amount of said substantially stoichiometric barium titanate is 87% by weight, the amount of said substantially stoichiometric calcium zirconate is 4 weight %, the amount of said substantially stoichiometric calcium stannate is 8.5 weight %, the amount of said substantially stoichiometric magnesium titanate is 0.1%, and said oxide of rare earth elements is $Nd_2O_3$ in an amount of 0.1%.

11. A high permittivity ceramic composition according to claim 7 wherein the amount of said substantially stoichiometric barium titanate is 86.5% by weight, the amount of said substantially stoichiometric calcium zirconate is 3.5 weight %, the amount of said substantially stoichiometric calcium stannate is 8 weight %, the amount of said substantially stoichiometric magnesium titanate is 0.15%, and said oxide of rare earth elements is $Sm_2O_3$ in an amount of 0.9%.

12. A high permittivity ceramic composition according to claim 7 in which said oxide of rare elements is selected from the group consisting of $La_2O_3$, $Ce_2O_3$, $Pr_2O_3$, $Nd_2O_3$, $Sm_2O_3$ and $Dy_2O_3$.

13. A high permittivity ceramic composition according to claim 1 in which said oxide of rare earth elements is selected from the group consisting of $La_2O_3$, $Ce_2O_3$, $Pr_2O_3$, $Nd_2O_3$, $Sm_2O_3$ and $Dy_2O_3$.

* * * * *